United States Patent
Shi et al.

(10) Patent No.: US 12,204,528 B2
(45) Date of Patent: Jan. 21, 2025

(54) CONVERTING DATABASE LANGUAGE STATEMENTS BETWEEN DIALECTS

(71) Applicant: MICRO FOCUS LLC, Santa Clara, CA (US)

(72) Inventors: Lei Shi, Shanghai (CN); Qin Zhou, Shanghai (CN); Bing Gu, Shanghai (CN); Dong-Hui Zhu, Shanghai (CN); Feng Yan, Shanghai (CN); Wen Zou, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 509 days.

(21) Appl. No.: 17/059,033

(22) PCT Filed: Jun. 15, 2018

(86) PCT No.: PCT/CN2018/091502
§ 371 (c)(1),
(2) Date: Nov. 25, 2020

(87) PCT Pub. No.: WO2019/237333
PCT Pub. Date: Dec. 19, 2019

(65) Prior Publication Data
US 2021/0209098 A1     Jul. 8, 2021

(51) Int. Cl.
*G06F 16/24*     (2019.01)
*G06F 16/242*    (2019.01)
(Continued)

(52) U.S. Cl.
CPC .... *G06F 16/2448* (2019.01); *G06F 16/24526* (2019.01); *G06F 16/24528* (2019.01); *G06F 16/24547* (2019.01); *G06F 16/258* (2019.01)

(58) Field of Classification Search
CPC .................................................. G06F 16/2448
See application file for complete search history.

(56) References Cited

U.S. PATENT DOCUMENTS

| | | |
|---|---|---|
| 7,664,795 B2 | 2/2010 | Balin |
| 8,407,237 B1 | 3/2013 | Kudryavtsev |

(Continued)

FOREIGN PATENT DOCUMENTS

| | | |
|---|---|---|
| CN | 105335366 A | 2/2016 |
| CN | 105335412 A | 2/2016 |

(Continued)

OTHER PUBLICATIONS

Author Unknown; Refactoring to Reactive—Anatomy of a JDBC Migration; www.infoq.com/articles/Refactoring-Reactive-JDBC; Feb. 15, 2018; 25 pages.

(Continued)

*Primary Examiner* — Mohammad S Rostami
(74) *Attorney, Agent, or Firm* — Sheridan Ross P.C.

(57) ABSTRACT

A system receives a source database language statement according to a first dialect, determines a pattern of the source database language statement, the pattern comprising an abstract representation of the source database language statement, and checks whether the determined pattern is present in a cache of translations between patterns according to the first dialect and corresponding patterns according to a second dialect different from the first dialect. In response to the determined pattern being present in the cache of translations, the system converts, using a corresponding translation in the cache of translations, the source database language statement according to the first dialect to a respective target database language statement according to the second dialect.

20 Claims, 8 Drawing Sheets

(51) Int. Cl.
    *G06F 16/2452* (2019.01)
    *G06F 16/2453* (2019.01)
    *G06F 16/25* (2019.01)

(56) References Cited

U.S. PATENT DOCUMENTS

| | | | | |
|---|---|---|---|---|
| 9,183,272 | B1* | 11/2015 | Jonsson | G06F 16/283 |
| 9,317,266 | B1 | 4/2016 | Muldoon | |
| 10,649,962 | B1* | 5/2020 | Wilton | G06F 16/1734 |
| 2004/0117359 | A1 | 6/2004 | Snodgrass | |
| 2005/0149537 | A1* | 7/2005 | Balin | G06F 16/214 |
| 2005/0289125 | A1* | 12/2005 | Liu | G06F 16/2448 |
| 2008/0222616 | A1* | 9/2008 | Cheng | G06F 8/51 |
| | | | | 717/137 |
| 2014/0181073 | A1* | 6/2014 | Wong | G06F 16/24526 |
| | | | | 707/714 |
| 2014/0280259 | A1* | 9/2014 | McGillin | G06F 16/2452 |
| | | | | 707/756 |
| 2015/0026668 | A1* | 1/2015 | Boening | G06F 8/51 |
| | | | | 717/137 |
| 2015/0161112 | A1* | 6/2015 | Galvez | G06F 9/454 |
| | | | | 704/7 |
| 2015/0302058 | A1* | 10/2015 | Li | G06F 16/284 |
| | | | | 707/714 |
| 2015/0356078 | A1* | 12/2015 | Kishimoto | G06F 16/1827 |
| | | | | 707/610 |
| 2016/0070478 | A1* | 3/2016 | Hara | G06F 3/067 |
| | | | | 711/114 |
| 2016/0085585 | A1* | 3/2016 | Chen | G06F 12/08 |
| | | | | 711/205 |
| 2016/0357532 | A1* | 12/2016 | Gasselin de Richebourg | |
| | | | | G06T 15/80 |
| 2017/0212829 | A1* | 7/2017 | Bales | G06F 11/3604 |
| 2017/0364293 | A1* | 12/2017 | Huang | G06F 3/061 |
| 2018/0004441 | A1* | 1/2018 | Takamura | G06F 3/0647 |
| 2018/0039527 | A1* | 2/2018 | Gassner | G06F 16/11 |
| 2018/0121501 | A1* | 5/2018 | Vaquero Gonzalez | |
| | | | | G06F 16/284 |
| 2018/0129443 | A1* | 5/2018 | Karve | G06F 3/0653 |
| 2018/0150485 | A1* | 5/2018 | Tripathy | G06F 16/1748 |
| 2018/0203614 | A1* | 7/2018 | Aronovich | G06F 3/0683 |
| 2018/0218031 | A1* | 8/2018 | Wong | G06F 16/2425 |
| 2018/0314737 | A1* | 11/2018 | Chong | G06F 16/2456 |
| 2019/0042470 | A1* | 2/2019 | Barczak | G06F 12/12 |
| 2019/0266271 | A1* | 8/2019 | Leau | G06F 16/30 |
| 2019/0354592 | A1* | 11/2019 | Musham | G10L 13/00 |

FOREIGN PATENT DOCUMENTS

| | | |
|---|---|---|
| CN | 106897322 A | 6/2017 |
| WO | WO-WO2001016724 A2 | 3/2001 |
| WO | WO-WO2005067396 A2 | 7/2005 |

OTHER PUBLICATIONS

ISA; International Search Report / Written Opinion; PCT/CN2018/091502; Mailed Mar. 13, 2018; 9 pages.

Meta Integration Technology, In.; Meta Integration® Model Bridge (MIMB) "Metadata Integration" Solution; Readme for Release Notes, Installation & Setup; www.metaintegration.com; 1997-2017; 53 pages.

\* cited by examiner

CONVERTING DATABASE LANGUAGE STATEMENTS BETWEEN DIALECTS

BACKGROUND

A relational database stores data in relational tables. A relational table organizes data into rows and columns, where a row refers to a record or tuple that stores data, and each record or tuple includes attributes that correspond to the columns of the table. Different relational databases can be provided by respective different database management servers.

BRIEF DESCRIPTION OF THE DRAWINGS

Some implementations of the present disclosure are described with respect to the following figures.

Figure 1:
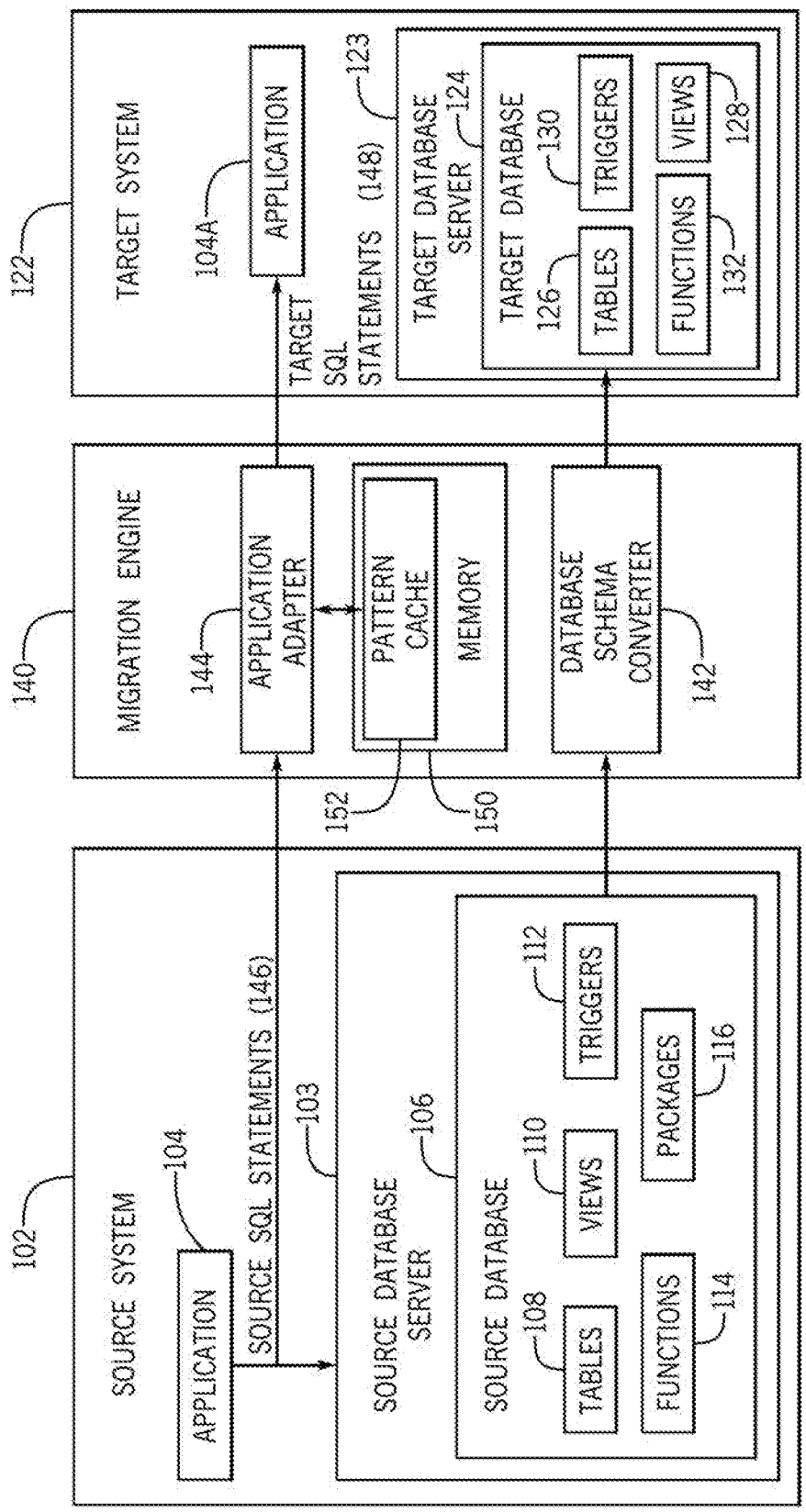
FIG. 1 is a block diagram of an arrangement that includes a migration engine for migrating between different database servers, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A database management server includes database management instructions that manage the storage and access of data in a relational database. The database management server receives database language statements to access data and manage data in the relational database. The access of data can include retrieving data, modifying (updating or deleting data), and adding data. The managing of data can include creating, modifying, or deleting relational tables, views, or other data structures. Examples of database language statements include Structured Query Language (SQL) statements.

Examples of database management servers include those provided by various different vendors, including Oracle, Microsoft, and so forth. Database management servers can also include open source database management servers. The source code of an open source database management servers is readily available (e.g., free to download and use) for modification and even redistribution for creation of a specific database management system. Examples of open source database servers include a MySQL database server, a PostgreSQL database server, and so forth.

An enterprise that operates a system that employs an existing database management server may desire to change to use of a different database management server. An enterprise can refer to a business, an educational organization, a government agency, an individual, or any other type of entity.

An enterprise may decide to change database management servers for any of various reasons. For example, the enterprise may wish to convert from a proprietary database management server to an open source database management server for cost savings reasons. To use a proprietary database management server, the enterprise may have to pay a licensing fee to the vendor of the proprietary database management server. However, an open source database management server may not be subject to a license fee. An enterprise may also wish to change database management server for other reasons, such as for improved performance, easier maintenance, and so forth. Although some examples refer to switching from a proprietary database management server to an open source database management server, other changes may also be performed, including changing between different proprietary database management servers, or changing from an open source database management server to a proprietary database management server.

A system that includes a database management server can include an application (or multiple applications) that can issue queries to the database management server. An "application" refers to any program (formed with machine-readable instructions such as software and/or firmware) that is executable to perform respective tasks.

The application can include source code that has database language statements that can be issued to access data in a relational database of the database management server. Additionally, the application can dynamically generate database language statements at runtime of the application.

To switch the application from use of a first database management server to a second database management server, it can be difficult to convert database language statements in a first dialect of the first database management server to a second dialect of the second database management server. Different database management servers can use different dialects of database language statements. A "dialect" of database language statements includes a syntax and capability of the database language statements. In specific examples, although different dialects of database language statements can be according to SQL, the syntaxes and capabilities of the different dialects of SQL statements can be different.

For example, different syntaxes can refer to different manners of expressing variables, different ways of handling functions or stored procedures, and so forth. A function refers to code that receives a value of an input variable (or values of multiple input variables) and produces an output value (or output values) based on performing a specified task (or tasks). A stored procedure refers to code that can be defined to accept zero or more input variables and to output zero or more output variables based on performing a specified task (or tasks).

As a further example, different capabilities of different dialects of SQL statements can refer to features available to one dialect that is not available to another dialect. For example, one dialect can use packages, while another dialect is unable to use packages. A "package" refers to a group of functions or stored procedures stored together for use as a unit. As another example, a function or stored procedure that can be defined in one dialect may not be available in another dialect.

In accordance with some implementations of the present disclosure, a database application adapter is able to convert database language statements according to a source dialect for a source database server to database language statements according to a target dialect for a target database server, as part of a process to migrate from the source database server to the target database server.

FIG. 1 shows an example arrangement that includes a source system 102 and a target system 122. The source system 102 includes a source database server 103, while the target system 122 includes a target database server 123 different from the source database server 103. For example, the source database server 103 can be a proprietary database server, such as provided by Oracle or Microsoft. The target database server 123 can be an open source database server, such as a MySQL database server or Postgres SQL database server. Although the foregoing refers to specific examples of the source and target database servers 103 and 123, other types of source and target database servers 103 and 123 can be used in other examples.

Each of the source and target systems 102 and 122 can be implemented using a computing platform that has a computer or an arrangement of computers. Note that the source and target systems 102 and 122 can both be implemented on the same computing platform. In such an example, the source database server 103 on the computing platform is migrated to the target database sever 123 on the computing platform. In alternative examples, the source and target systems 102 and 122 can be implemented using different computing platforms.

The migration between the source database server 103 and the target database sever 123 is performed by a migration engine 140. As used here, the term "engine" can refer to a hardware processing circuit, such as any or some combination of the following: a microprocessor, a core of the multi-core microprocessor, a microcontroller, a programmable integrated circuit device, a programmable gate array, and so forth. In other examples, an "engine" can refer to a combination of a hardware processing circuit and machine-readable instructions executable on the hardware processing circuit.

The source system 102 includes an application 104 that is able to issue source SQL statements 146 to access or manage data of the source database server 103 that stores data in a source database 106. The source database 106 includes various data structures, including tables 108, views 110 (a view is a result set of a stored SQL statement on data), triggers 112 (a trigger is a stored procedure that is automatically executed in response to an event on a particular table or view in a database), functions 114 (a function is designed to perform a specified task or tasks), packages 116 (a package is a group of related stored procedures or functions), and so forth.

The source database server 103 of the source system 102 is to be migrated to a target database server 123 of the target system 122. In some examples, the target system 122 runs a converted application 104A, which is a converted version of the application 104 that is run in the source system 102. The core functionality of the application 104 is not changed in the converted application 104A. The converted application 104A differs from the application 104 in the dialect of SQL statements used by the respective converted application 104A and application 104. While the source SQL statements 146 issued by the application 104 are according to a source dialect for accessing or managing data of the source database server 103, target SQL statements of the converted application 104A are according to a target dialect (different from the source dialect) for accessing or managing data of the target database server 123.

In alternative examples, the application in the target system 122 can be identical to the application 104 in the source system 102. In such alternative examples, runtime conversion between source and target SQL statements can be performed without modifying the application 104.

The target database server 123 includes various data structures, including tables 126, views 130, triggers 132, and functions 134. In the example of FIG. 1, while the source database server 103 supports the use of packages 116, the target database server 123 does not support the use of packages. This depicts an example difference in capabilities between the first and second dialects of SQL statements used by the source database server 103 and the target database server 123, respectively.

The migration engine 140 converts between the source system 102 and the target system 122. The migration engine 140 can be part of the source database 102 or target system 122, or can be separate from the source system 102 and/or target system 122.

The migration engine 140 includes a database schema converter 142 to convert between a source database schema of the source database 106 (where the source database schema defines the tables 108, views 110, triggers 112, functions 114, and packages 116) and a target database schema of the target database 124 (where the target database schema defines the tables 126, views 130, triggers 132, and functions 134). A database schema refers to information that defines the organization of data as stored in a database (and more specifically, of the organizational data as stored in relational tables of the database). The database schema can define how the database is constructed, e.g., how the database is divided into relational tables, and the database schema can also define the structure of the relational tables (including the attributes of the tables, indexes used by the tables, and so forth). The database schema can also define procedures, functions, views, and other aspects of a relational database. The database schema converter 142 can use any of various migration tools that migrate between different database schemas used in different databases.

In addition, the migration engine 140 includes an application adapter 144 according to some implementations of the present disclosure to adapt the application 104 for use with the target database server 123, instead of the source database server 103. The source code of the application 104 can include SQL statements according to the source dialect. Additionally, the application 104 can dynamically generate SQL statements according to the source dialect. For example, a stored procedure in the application 104 when called can dynamically generate SQL statements issued to the source database server 103.

The application adapter 144 converts between source SQL statements 146 according to the source dialect and target SQL statements 148 according to the target dialect. In some examples, the conversion performed by the application adapter 144 can be performed during runtime of the source system 102. During the runtime of the source system 102, the application 104 is executing and issuing the source SQL statements 146 to the source database server 103. The issued source SQL statements 146 are intercepted by the application adapter 144 and converted to the target SQL statements 148.

The application adapter 144 can modify the source code of the application 104 to produce the source code of the converted application 104A. The modification includes changing the dialect of the SQL statements from the source dialect in the source code of the application 104 to the target dialect in the source code of the converted application 104A. The application adapter 144 can also modify other code structures (e.g., stored procedures) that can dynamically generate SQL statements when called.

For increased efficiency, the migration engine 140 includes a memory 150 that stores a pattern cache 152 to store patterns of source SQL statements that have been encountered before. As used here, a "pattern" can refer to an abstract representation of a SQL statement. The pattern represents elements of the SQL statement in abstract form. In some examples, the pattern can be represented in the form of an abstract syntax tree (AST) or other tree structure. A tree structure includes nodes that represent the corresponding elements of the SQL statement, where the elements can include any or some combination of the following: variables (which can represent attributes of tables and generated output values), table names, view names, Boolean operators (e.g., AND, OR, etc.), comparison operators (e.g., =, <, >, etc.), predicates (e.g., WHERE x=1), literals (e.g., constant values), functional operators (e.g., SELECT, JOIN, etc.), and so forth.

An abstract representation of a SQL statement refers to a representation in which certain elements of the SQL statement are normalized, such as by parameterizing the SQL statement by abstracting specific constant values to a wildcard indication (e.g., x=1 is changed to x=?, where "?" is a wildcard indication), abstracting a list of values of a function or other operator to a wildcard indication (e.g., IN(1, 2, 3) changed to IN(??), where "??" is a wildcard indication), changing an order of an expression, such as by sorting the items in the expression (e.g., SELECT y, m, b is changed to SELECT b, m, y by sorting the order of "y, m, b").

The abstraction of a pattern allows for increasing the chances of matching patterns in the pattern cache 152. For example, a SQL statement that includes a specific predicate (e.g., x=1), a specific function (e.g., IN(1, 2, 3)), and a specific expression (e.g., SELECT y, m, b) can be matched only to another SQL statement that includes the identical specific predicate, specific function, and specific expression. By using the abstract representation of the pattern, however, a larger number of SQL statements can be matched to the pattern. More specifically, SQL statements that include a predicate in the form of x=?, a function in the form of IN(??), and a SELECT expression that includes b, m, y in any order can potentially be matched to the pattern.

The pattern cache 152 includes multiple translation entries, where each translation entry stores a respective source pattern (that represents a SQL statement according to the source dialect) and a corresponding target pattern (that represents a SQL statement according to the target dialect) translated from the respective source pattern. Every time a translation is performed between a unique combination of a source pattern and a target pattern, the corresponding source pattern and target pattern are added to as a translation entry to the pattern cache 152. In this way, when translating a subsequent SQL statement, a previous translation can be used if the subsequent SQL statement has a pattern that matches a source pattern in any of the entries of the pattern cache 152. In this way, the application adapter 144 does not have to generate a new translation for each received source SQL statement if a translation for a pattern of the received source SQL statement was already translated previously. For the received source SQL statement that has a pattern that matches any of the patterns stored in the pattern cache 152, the application adapter 144 can use the previously performed translation between the source pattern and the corresponding target pattern.

For further enhanced efficiency in performing translations, the pattern cache 152 can be populated with translation entries including translations between source and target patterns produced during development and/or testing of the application 104. As part of the development and/or testing of the application 104, developers and/or testers of the application 104 may invoke the application adapter 144 to translate certain source SQL statements according to the source dialect to target SQL statements according to the target dialect.

Such translations can be useful when converting source SQL statements to target SQL statements during the runtime of the application 104 in the source system 104. By pre-populating the pattern cache 152 with translation entries based on translations generated prior to the runtime of the application 104, the application adapter 144 can leverage such prior translations in converting source SQL statements to target SQL statements during the runtime of the application 104.

Figure 2:
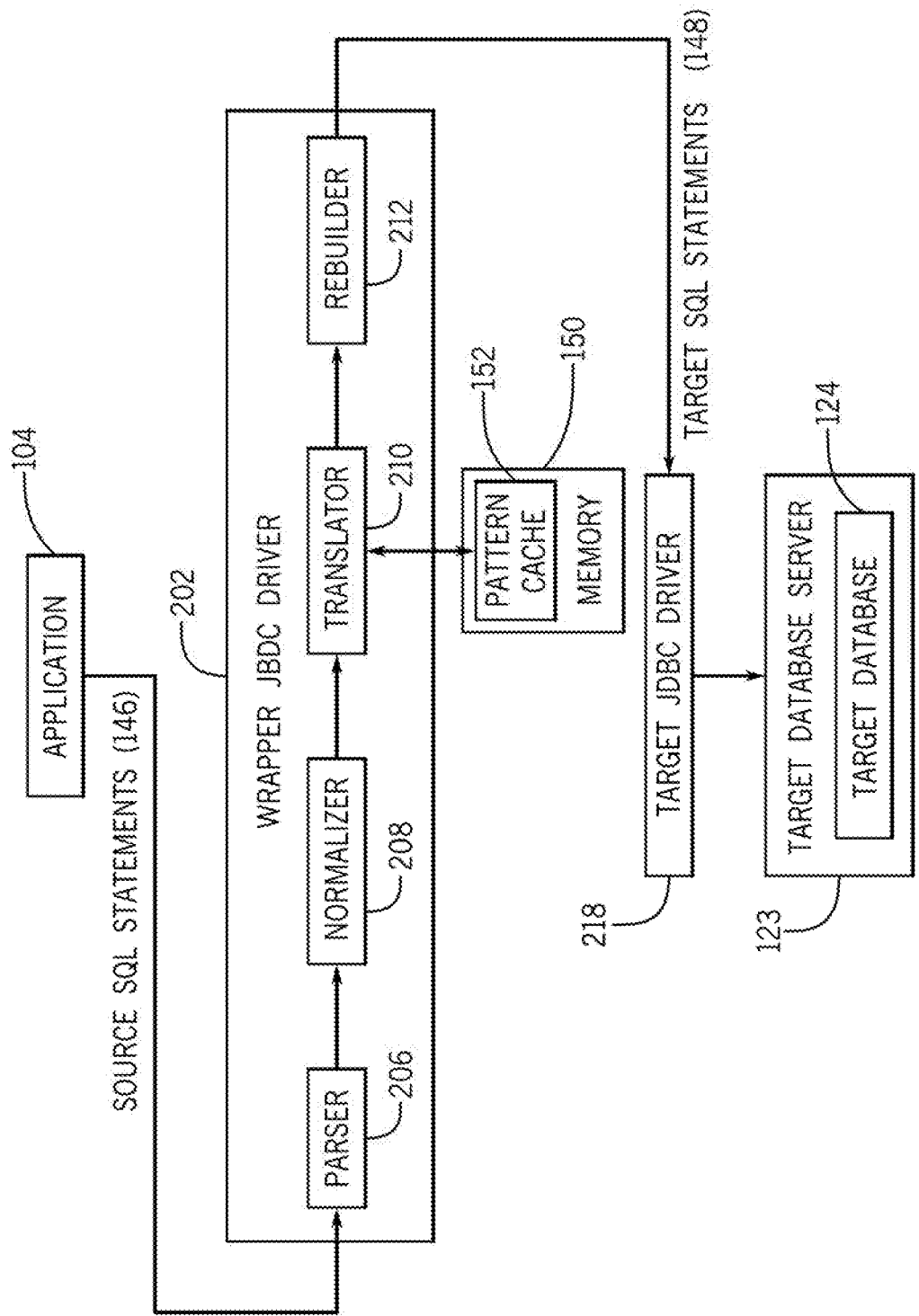
FIG. 2 is a block diagram of an arrangement for migrating between different database servers, according to further examples.

FIG. 2 is a block diagram of an example arrangement to perform runtime conversion between the source SQL statements 146 and the target SQL statements 148. In some examples, the application adapter 144 of FIG. 1 can be implemented using a wrapper Java Database Connectivity (JDBC) driver 202, as shown in FIG. 2.

JDBC is an application programming interface (API) for the JAVA programming language. JDBC defines how a client can access a database. A JDBC driver is a program enabling a Java application (e.g., the application 104) to interact with a database. A wrapper JDBC driver is a program that includes specified functionalities (e.g., the functionalities of the wrapper JDBC driver 202), and which is able to call another program, such as a target JDBC driver 218 that is used to access the target database server 123.

Although reference is made to use of JDBC in FIG. 2, it is noted that in other examples, other techniques for implementing the conversion engine 140 can be used.

The wrapper JDBC driver 202 intercepts SQL statements 146 generated by the application 104. The wrapper JDBC driver 202 includes a parser 206, a normalizer 208, a translator 210, and a rebuilder 212. The output of the wrapper JDBC driver 202 includes translated target SQL statements 148, which are provided to the target JDBC driver 218. The target JDBC driver 218 in turn issues the target SQL statements 148 to the target database server 123 to access the target database 124.

Figure 3:
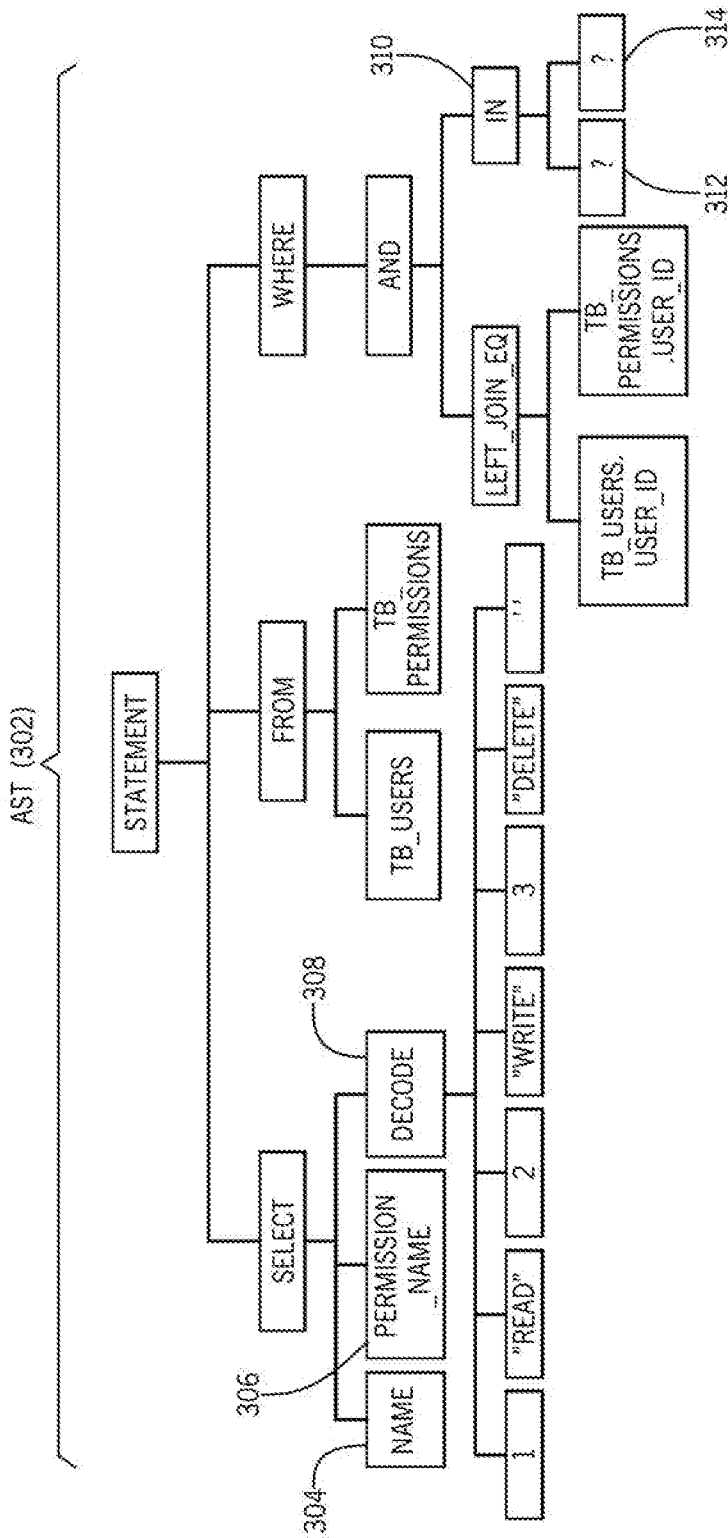
FIGS. 3-6 illustrate example abstract syntax trees (ASTs) used as part of the migrating according to some examples.

The parser 206 parses a source SQL statement 146 into an AST or other abstract representation of the source SQL statement 146. For example, the following source SQL statement 146 according to the source dialect can be parsed by the parser 206 into an AST tree 302 as shown in FIG. 3:

SELECT NAME, PERMISSION_NAME, DECODE (PERMISSION, 1, 'READ', 2 'WRITE', 3 'DELETE', '') FROM TB_USERS, TB_USER_PERMISSIONS WHERE USER_ID IN (?, ?) AND TB_USERS.USER_ID=TB_USER_PERMISSIONS.USER_ID(+).

The AST tree 302 represents the elements of the source SQL statement 146 as nodes of a tree.

The normalizer 208 normalizes the AST 302. The normalizing can include various actions to abstract the elements of the source SQL statement 146. For example, the order of the elements (304, 306, 308 in FIG. 3) of the SELECT clause is sorted (in alphabetical order) to produce the corresponding elements 308, 304, and 306 in the normalized AST 402 shown in FIG. 4.

Figure 4:
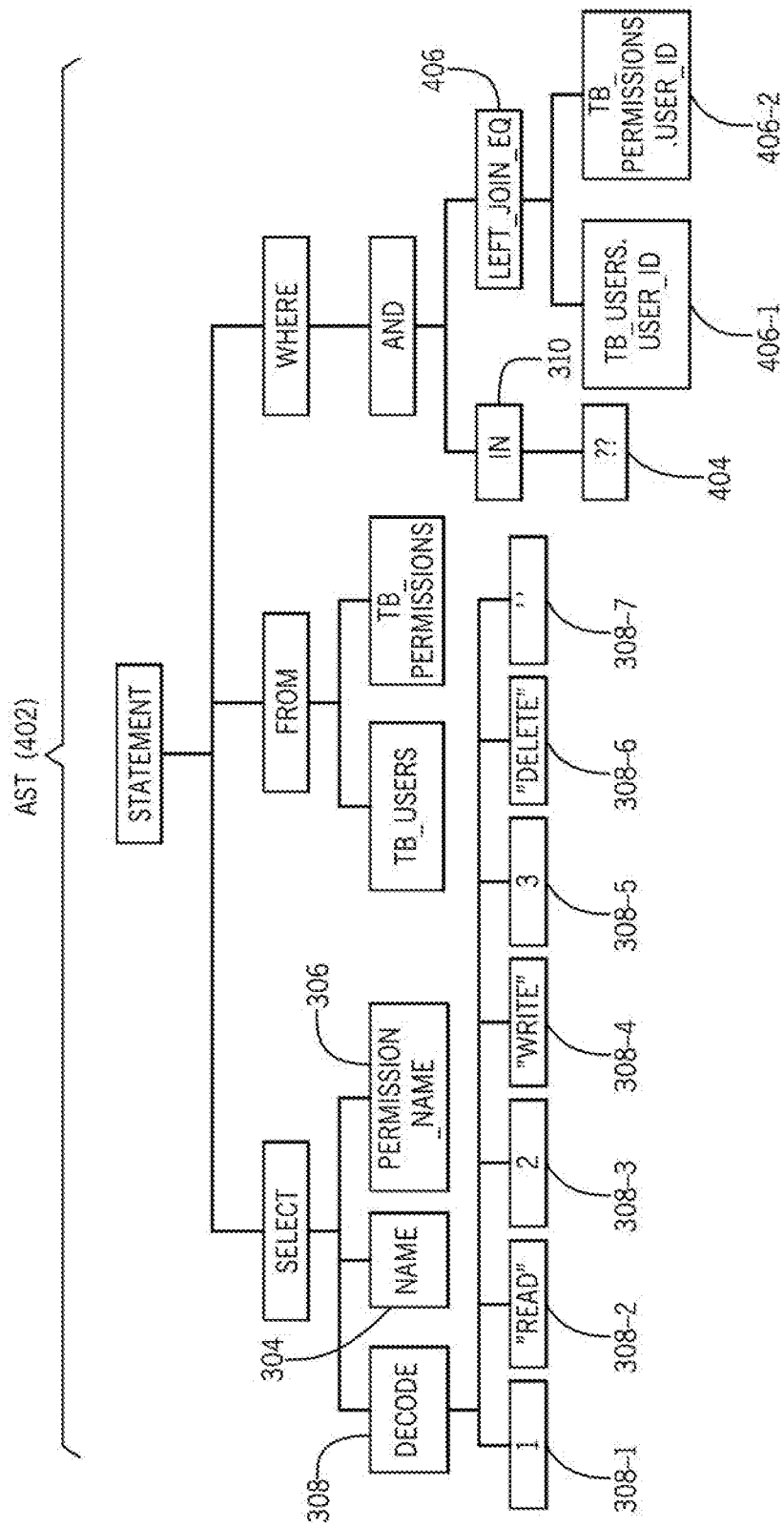

Also, in the example of FIGS. 3 and 4, the IN(?, ?) clause as represented by elements 310, 312, and 314 in FIG. 3 is normalized to IN(??) as represented by elements 310 and 404 in the normalized AST 402 of FIG. 4.

Moreover, although not shown, the normalizing can also include parameterizing the source SQL statement. For example, if the SQL statement includes a predicate "USER_ID=1," then this predicate can be normalized to "USER_ID=?." The parameterization converts specific values in predicate clauses to wildcard indications.

Other abstraction actions can also be performed by the normalizer 208.

The normalized AST 402 is then translated by the translator 210 from the source SQL dialect to the target SQL dialect. As part of the translation performed by the translator 210, the translator 210 searches the pattern cache 152 in the memory 150 to determine if the pattern cache 152 contains a translation entry containing a pattern (or more specifically, an AST) that matches the normalized AST 402. If so, the translation entry contains an existing translation between the normalized AST 402 according to the source dialect and a corresponding normalized AST according to the target SQL dialect. If a match occurs, this existing translation can be used by the translator 210 to perform the translation between the normalized AST 402 according to the source dialect and a normalized AST 502 (FIG. 5) according to a target dialect.

Figure 5:
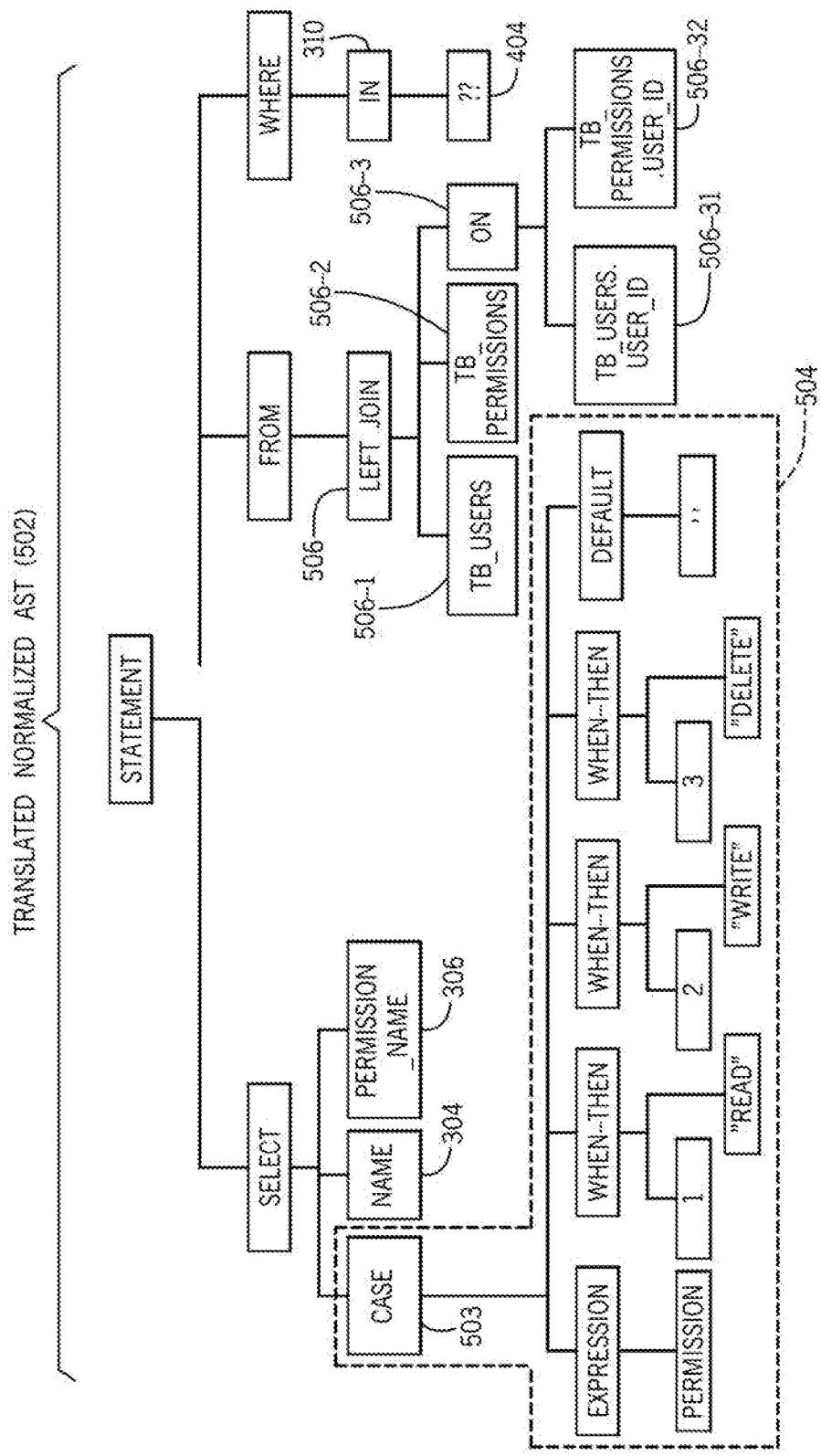

In the translation, the DECODE function represented by elements 308, 308-1, 308-2, 308-3, 308-4, 308-5, 308-6, and 308-7 of the normalized AST 402 of FIG. 4 is translated to elements in block 504 of the translated normalized AST 502 of FIG. 5. In this example, the DECODE function that exists in the source dialect does not exist in the target dialect, in which case the DECODE function is replaced with the CASE (represented by element 503 in FIG. 5) and WHEN-THEN clauses (generally in the form CASE (WHEN . . . THEN . . . END)) represented in block 504 of FIG. 5.

In addition, a left join expression represented by elements 406, 406-1, and 406-2 in the normalized AST 402 according to the source dialect of FIG. 4 is translated to a different left join expression represented by elements 506, 506-1, 506-2, 506-3, 506-31, and 506-32 of the translated normalized AST 502 according to the target dialect of FIG. 5.

The following sets forth an example of converting a left join expression in the source dialect to a left join expression in the target dialect:
SELECT*FROM A, B WHERE A.A_ID=B.B_ID(+)
converted to
SELECT*FROM A LEFT OUTER JOIN B ON A.A_ID=B.B_ID.

As another example, although not shown in FIGS. 4 and 5, an expression to obtain a next value in a sequence can also be converted, such as follows:
KNTA_USERS_S.NEXTVAL
converted to
NEXTVAL('KNTA_USERS_S').

Other translations can be performed by the translator 210 in other examples.

If the pattern cache 152 does not contain the normalized AST 402, then the translator 210 can perform the translation on the fly, during runtime. In such a scenario, a new translation entry that includes the normalized AST 402 and the translated normalized AST 502 is added to the pattern cache 152, for use in a future translation if the normalized AST 402 is encountered again.

In some examples, the translator 210 can derived from an ANother Tool for Language Recognition (ANTLR) library, which can be used to generate tree parsers for parsing ASTs.

Figure 6:
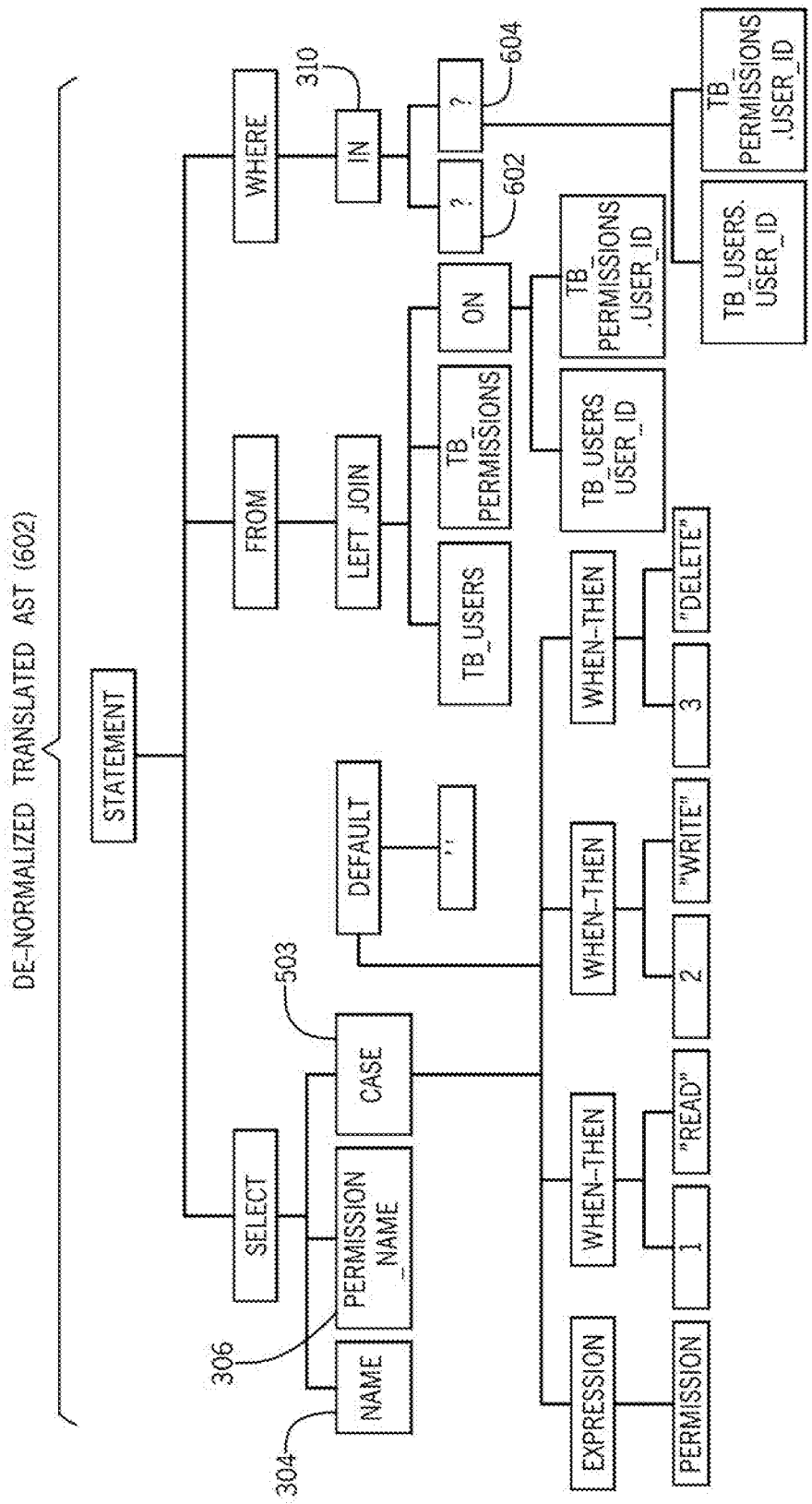

The rebuilder 212 de-normalizes the translated normalized AST 502 to produce a de-normalized translated AST 602 of FIG. 6. For example, the order of the original SELECT clause (as represented by the AST 302) can be restored. For example, the order of elements 503, 304, and 306 in the translated normalized AST 502 of FIG. 5 is changed to the order of elements 304, 306, and 503 in the de-normalized AST 602 of FIG. 6. Moreover, the IN (??) function is de-normalized to IN (?, ?) (i.e., the wildcard indication "??" is de-abstracted to a list of values "(?,?)." This is depicted as changing the elements 310 and 404 in the translated normalized AST 502 of FIG. 5 to the corresponding elements 310, 602, and 604 in the de-normalized translated AST 602 of FIG. 6. In addition, in a predicate, a wildcard indication is de-abstracted to a constant value.

The rebuilder 214 can then uses the de-normalized translated AST 602 to rebuild a target SQL statement 148 according to the target SQL dialect, as set forth below:
SELECT NAME, PERMISSION_NAME, CASE PERMISSION WHEN 1 THEN 'READ' WHEN 2 THEN 'WRITE' WHEN 3 THEN 'DELETE' ELSE " END FROM TB_USERS LEFT JOIN TB_USER_PERMISSIONS ON TB_USERS.USER_ID=TB_USER_PERMISSIONS.USER_ID WHERE USER_ID IN (?, ?).

By using techniques or mechanisms according to some implementations of the present disclosure, the migration of a system from using a source database server to a target database server can be accomplished without modifying the core functionality of the application 104. In some cases, if the application 104 is modified, just the database language statements of the application 104 are modified. Since the core functionality of the application 104, multiple copies of source code of the application 104 do not have to be maintained.

Also, the migration can be performed at runtime of the application 104, in which source database language statements according to the source dialect are converted to target database language statements according to the target dialect while the application 104 is running. In addition, the source database language statements according to the source dialect may have been customized by enterprises—the migration engine according to some implementations is able to translate such customized source database language statements.

Figure 7:
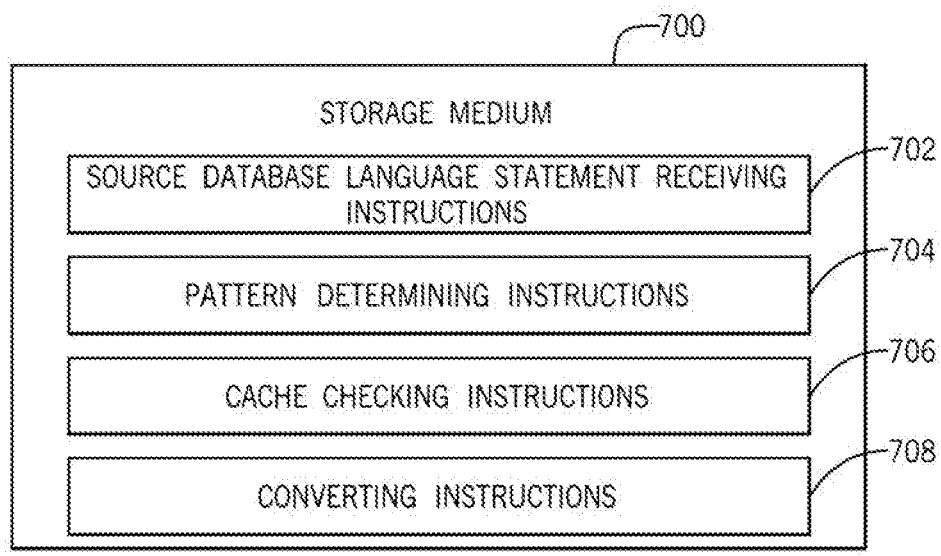
FIG. 7 is a block diagram of a storage medium storing machine-readable instructions according to some examples.

FIG. 7 is a block diagram of a non-transitory machine-readable or computer-readable storage medium 700 storing program code (including machine-readable instructions) that upon execution causes a system to perform respective tasks. The program code includes source database language statement receiving instructions 702 to receive a source database language statement according to a first dialect; pattern determining instructions 704 to determine a pattern of the source database language statement, the pattern comprising an abstract representation of the source database language statement; cache checking instructions 706 to check whether the determined pattern is present in a cache of translations between patterns according to the first dialect and corresponding patterns according to a second dialect different from the first dialect; and converting instructions 708 to, in response to the determined pattern being present in the cache of translations, convert, using a corresponding translation in the cache of translations, the source database language statement according to the first dialect to a respective target database language statement according to the second dialect.

Figure 8:
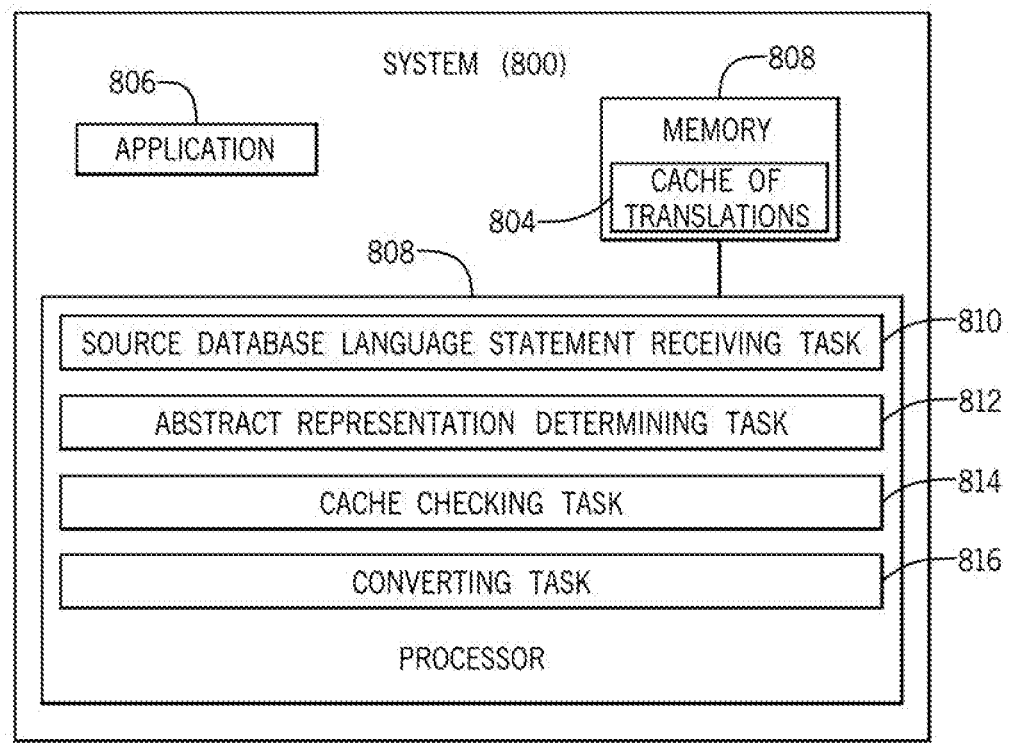
FIG. 8 is a block diagram of a system according to some examples.

FIG. 8 is a block diagram of a system 800 that includes a memory 802 to store a cache 804 of translations, an application 806, and a hardware processor 808 to perform respective tasks. A hardware processor can include a microprocessor, a core of a multi-core microprocessor, a microcontroller, a programmable integrated circuit, a programmable gate array, or another hardware processing circuit. A hardware processor performing a task can refer to a single hardware processor performing the task or multiple hardware processors performing the task.

The tasks performed by the hardware processor 808 can include a source database language statement receiving task 810 to receive a source database language statement according to a first dialect issued by the application, an abstract representation determining task 812 to determine an abstract representation of the source database language statement, a cache checking task 814 to check whether the determined abstract representation is present in the cache of translations between abstract representations according to the first dialect and corresponding abstract representations according to a second dialect different from the first dialect, and a converting task 816 to, in response to the determined abstract representation being present in the cache of translations, convert, using a corresponding translation in the cache of translations, the source database language statement according to the first dialect to a respective target database language statement according to the second dialect.

Figure 9:
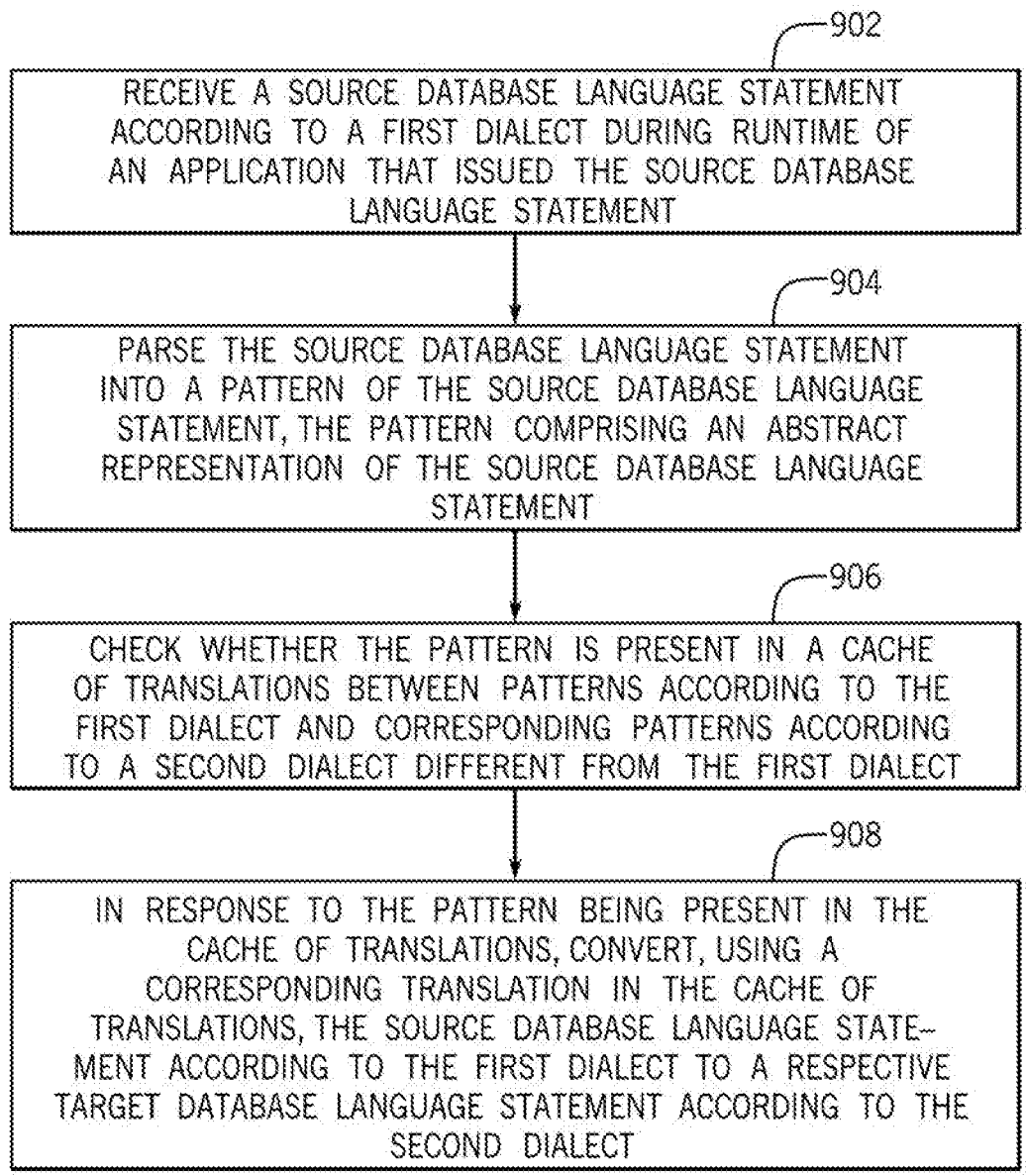
FIG. 9 is a flow diagram of a process according to further examples.

FIG. 9 is a flow diagram of a process according to some implementations, which can be performed by a system that includes a migration engine (e.g., 140 in FIG. 1), according to some examples. The process includes receiving (at 902) a source database language statement according to a first dialect during runtime of an application that issued the source database language statement.

The process further includes parsing (at 904) the source database language statement into a pattern of the source database language statement, the pattern comprising an abstract representation of the source database language statement.

The process further includes checking (at 906) whether the pattern is present in a cache of translations between patterns according to the first dialect and corresponding patterns according to a second dialect different from the first dialect.

In response to the pattern being present in the cache of translations, the process converts (at 908), using a corresponding translation in the cache of translations, the source database language statement according to the first dialect to a respective target database language statement according to the second dialect.

The storage medium 700 of FIG. 7 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site (e.g., a cloud) from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing program code that upon execution causes a system to:

receive from a first server over a network, using an application programming interface, a source database language statement according to a first dialect issued by an application;

determine a pattern of the source database language statement, the pattern comprising an abstract representation of the source database language, wherein determine the pattern of the source database language statement comprises:

parse the source database language statement into a representation of the source database language statement; and normalize the representation of the source database language statement into the pattern of the source database language statement, wherein normalize the representation includes reordering elements of the source database language statement;

check whether the determined pattern is present in a cache of translations between patterns according to the first dialect and corresponding patterns according to a second dialect different from the first dialect;

in response to the determined pattern being present in the cache of translations, convert, using a corresponding translation in the cache of translations, the source database language statement according to the first dialect to a respective target database language statement according to the second dialect used by a second server, wherein convert the source database language statement further includes:

convert, using the corresponding translation in the cache of translations, the determined pattern that is according to the first dialect to a target pattern according to the second dialect;

generate the respective target database language statement according to the second dialect based on the target pattern; and de-normalize the target pattern to produce a representation of the respective target database language statement according to the second dialect, wherein de-normalize the target pattern includes reversing the reordering of the elements of the source database language statement;

perform the receive, the determine, the check, and the convert during runtime of the application without interrupting the application; and increase efficiency in accessing data and managing data in a database of the second server to migrate from the first server to the second server by pre-populating the cache of translations with entries containing translations between the first dialect and the second dialect prior to the runtime of the application.

2. The non-transitory machine-readable storage medium of claim 1, wherein the determined pattern is a first abstract syntax tree (AST), and the target pattern is a second AST, and wherein the cache of translations includes a plurality of entries, each respective entry of the plurality of entries including a respective AST according to the first dialect and a corresponding AST according to the second dialect translated from the respective AST according to the first dialect.

3. The non-transitory machine-readable storage medium of claim 1, wherein the normalize comprises one or more of:
abstract a constant value to a wildcard indication, or
abstract a list of values to a wildcard indication.

4. The non-transitory machine-readable storage medium of claim 1, wherein the de-normalize comprises one or more of:
de-abstract a wildcard indication to a constant value, or
de-abstract a wildcard indication to a list of values.

5. The non-transitory machine-readable storage medium of claim 1, wherein a syntax of the source database language statement according to the first dialect differs from a syntax of the respective target database language statement according to the second dialect.

6. The non-transitory machine-readable storage medium of claim 1, wherein a capability of the source database language statement according to the first dialect differs from a capability of the respective target database language statement according to the second dialect.

7. A system, comprising:
a memory to store a cache of translations;
an application; and
a processor to:
receive from a first server over a network, using an application programming interface, a source database language statement according to a first dialect issued by the application;
determine an abstract representation of the source database language statement,
wherein determine the abstract representation of the source database language statement comprises:
parse the source database language statement into a representation of the source database language statement; and
normalize the representation of the source database language statement into the abstract representation of the source database language statement,
wherein normalize the representation includes reordering elements of the source database language statement;
check whether the determined abstract representation is present in the cache of translations between abstract representations according to the first dialect and corresponding abstract representations according to a second dialect different from the first dialect;
in response to the determined abstract representation being present in the cache of translations, convert, using a corresponding translation in the cache of translations, the source database language statement according to the first dialect to a respective target database language statement according to the second dialect used by a second server,
wherein convert the source database language statement further includes:
convert, using the corresponding translation in the cache of translations, the determined abstract representation that is according to the first dialect to a target abstract representation according to the second dialect;
generate the respective target database language statement according to the second dialect based on the target abstract representation; and
de-normalize the target abstract representation to produce a representation of the respective target database language statement according to the second dialect,
wherein de-normalize the target abstraction representation includes reversing the reordering of the elements of the source database language statement;
perform the receive, the determine, the check, and the convert during runtime of the application without interrupting the application; and
increase efficiency in accessing data and managing data in a database of the second server to migrate from the first server to the second server by pre-populating the cache of translations with entries containing translations between the first dialect and the second dialect prior to the runtime of the application.

8. The system of claim 7, wherein the cache of translations comprises translations between abstract syntax trees (ASTs) according to the first dialect and corresponding ASTs according to the second dialect.

9. The system of claim 7, wherein the normalize comprises one or more of:
abstract a constant value to a wildcard indication, or
abstract a list of values to a wildcard indication.

10. The system of claim 7, wherein the de-normalize comprises one or more of:
de-abstract a wildcard indication to a constant value, or
de-abstract a wildcard indication to a list of values.

11. The system of claim 7, wherein a syntax of the source database language statement according to the first dialect differs from a syntax of the respective target database language statement according to the second dialect.

12. The system of claim 7, wherein a capability of the source database language statement according to the first dialect differs from a capability of the respective target database language statement according to the second dialect.

13. A method, comprising:
receiving, from a first server over a network, using an application programming interface, in a system comprising a hardware processor, a source database language statement according to a first dialect during runtime of an application that issued the source database language statement;
parsing, by the system, the source database language statement into a pattern of the source database language statement, the pattern comprising an abstract representation of the source database language statement;
normalizing, by the system, the abstract representation of the source database language statement into the pattern of the source database language statement,
wherein normalizing the abstract representation includes reordering elements of the source database language statement;
checking, by the system, whether the pattern is present in a cache of translations between patterns according to the first dialect and corresponding patterns according to a second dialect different from the first dialect;

in response to the pattern being present in the cache of translations, converting, by the system using a corresponding translation in the cache of translations, the source database language statement according to the first dialect to a respective target database language statement according to the second dialect used by a second server, wherein converting the source database language statement further includes:

converting, using the corresponding translation in the cache of translations, the pattern that is according to the first dialect to a target pattern according to the second dialect;

generating the respective target database language statement according to the second dialect based on the target pattern; and de-normalizing the target pattern to produce a representation of the respective target database language statement according to the second dialect, wherein de-normalizing the target pattern includes reversing the reordering of the elements of the source database language statement;

performing the receiving, parsing, the checking, and the converting during runtime of the application without interrupting the application; and increasing efficiency in accessing data and managing data in a database of the second server to migrate from the first server to the second server by pre-populating the cache of translations with entries containing translations between the first dialect and the second dialect prior to the runtime of the application.

14. The method of claim 13, wherein the source database language statement comprises a source Structured Query Language (SQL) statement according to the first dialect, and the respective target database language statement comprises a target SQL statement according to the second dialect.

15. The method of claim 13, wherein the pattern of the source database language statement comprises an abstract syntax tree (AST), and the cache of translations comprises translations between ASTs according to the first dialect and corresponding ASTs according to the second dialect.

16. The method of claim 13, wherein the cache of translations comprises translations between abstract syntax trees (ASTs) according to the first dialect and corresponding ASTs according to the second dialect.

17. The method of claim 13, wherein the normalizing comprises one or more of:

abstracting a constant value to a wildcard indication, or abstracting a list of values to a wildcard indication.

18. The method of claim 13, wherein the de-normalizing comprises one or more of:

de-abstracting a wildcard indication to a constant value, or de-abstracting a wildcard indication to a list of values.

19. The method of claim 13, wherein a syntax of the source database language statement according to the first dialect differs from a syntax of the respective target database language statement according to the second dialect.

20. The method of claim 13, wherein a capability of the source database language statement according to the first dialect differs from a capability of the respective target database language statement according to the second dialect.

\* \* \* \* \*